(12) United States Patent
Chen et al.

(10) Patent No.: US 8,798,185 B2
(45) Date of Patent: Aug. 5, 2014

(54) METHOD AND SYSTEM FOR MIMO CHANNEL INFORMATION FEEDBACK

(75) Inventors: Yijian Chen, Shenzhen (CN); Wu Yin, Shenzhen (CN); Yu Ngok Li, Shenzhen (CN); Jun Xu, Shenzhen (CN); Xun Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 100 days.

(21) Appl. No.: 13/577,789

(22) PCT Filed: Oct. 22, 2010

(86) PCT No.: PCT/CN2010/078023
§ 371 (c)(1),
(2), (4) Date: Aug. 8, 2012

(87) PCT Pub. No.: WO2011/097896
PCT Pub. Date: Aug. 18, 2011

(65) Prior Publication Data
US 2012/0300868 A1    Nov. 29, 2012

(30) Foreign Application Priority Data
Feb. 12, 2010    (CN) .......................... 2010 1 0114470

(51) Int. Cl.
*H04B 7/02* (2006.01)
*H04B 7/06* (2006.01)
*H04L 1/00* (2006.01)

(52) U.S. Cl.
CPC .............. *H04L 1/0025* (2013.01); *H04B 7/063* (2013.01); *H04B 7/0645* (2013.01)
USPC ........................................................ 375/267

(58) Field of Classification Search
USPC ......... 375/211, 219, 259, 260, 262, 267, 285, 375/299
See application file for complete search history.

(56) References Cited

U.S. PATENT DOCUMENTS

2008/0219373 A1*    9/2008    Zhang et al. .................. 375/262
2008/0247475 A1*    10/2008   Kim et al. ..................... 375/260
(Continued)

FOREIGN PATENT DOCUMENTS

| CN | 101222259 A | 7/2008 |
| CN | 101262309 A | 9/2008 |
| CN | 101771510 A | 7/2010 |

OTHER PUBLICATIONS

International Search Report for PCT/CN2010/078023 dated Jan. 10, 2011.

*Primary Examiner* — Sam K Ahn
*Assistant Examiner* — Syed Haider
(74) *Attorney, Agent, or Firm* — Ling Wu; Stephen Yang; Ling and Yang Intellectual Property

(57) ABSTRACT

The present invention discloses a method for Multiple Input Multiple Output (MIMO) channel information feedback, and the method includes: a terminal selecting part of column vectors for MIMO system feedback from a codebook matrix W corresponding to a Precoding Matrix Indicator (PMI) and marking the selected part of column vectors as $W_{part}$; the terminal determining information O which represents high-precision vector quantification information of MIMO along with the part of column vectors $W_{part}$ according to a common representation relationship F, and feeding back the information O to a base station. The present invention also discloses a terminal and a base station which support MIMO. The present invention achieves high-precision and low-overhead channel information feedback and can well support multiple vector feedback needed by high rank (more layer multiplexing) MIMO transmission and high-precision feedback needed by low rank MIMO transmission simultaneously.

9 Claims, 2 Drawing Sheets

(56) References Cited

U.S. PATENT DOCUMENTS

| | | | |
|---|---|---|---|
| 2008/0298482 A1* | 12/2008 | Rensburg et al. | 375/260 |
| 2009/0080549 A1 | 3/2009 | Khan et al. | |
| 2009/0268840 A1* | 10/2009 | Clerckx et al. | 375/267 |
| 2012/0201321 A1* | 8/2012 | Koivisto et al. | 375/267 |

\* cited by examiner

METHOD AND SYSTEM FOR MIMO CHANNEL INFORMATION FEEDBACK

TECHNICAL FIELD

The present invention relates to the field of mobile broadband wireless access system, and in particular, to a method and system for Multiple Input Multiple Output (MIMO) channel information feedback.

BACKGROUND ART

Recently, the long term evolution (LTE) project and Worldwide Interoperability Microwave Access (Wimax) and the like in the $4^{th}$ generation wireless mobile communication system (4G) have been developed rapidly. Application of MIMO has become a milestone of the development of the wireless communication system, and has significantly improved the throughput, the spectrum effectiveness and system link performance of the wireless mobile communication system.

In the current mainstream standards, the most important problem in the multi-antenna technology is the channel information feedback technique. Generally speaking, the channel between the transmitting and receiving antennae can be represented in the form of matrix, and further, the channel matrix can be described and fed back through information of vectors and eigenvalues. The vector information is very important to the precoding technology of MIMO, since it directly affects the performance of the MIMO system. The vectors are generally fed back in a codebook-based feedback method.

The basic principle of codebook based quantitative feedback of channel information is as follows: if it is assumed that the limited feedback channel capacity is B bps/Hz, then the number of available codewords is $N=2^B$. The vector space of the channel matrix constitutes a codebook space $\Re = \{F_1, F_2 L F_N\}$ after quantification. The transmitting end and the receiving end collectively store or generate this codebook in real time (the transmitting end and the receiving end are the same). For each channel implementation H, the receiving end selects a codeword $\hat{F}$ mostly matched with the channel from $\Re$ according to certain rules, and feeds back the sequence number i of the codeword to the transmitting end. The transmitting end finds out the pre-coding codeword $\hat{F}$ according to this sequence number i, and obtains channel information, which is mainly the vector information of the channel.

Generally, the codebook space $\Re$ may be further divided into codebooks corresponding to multiple Ranks, and each Rank corresponds to multiple codewords to quantify the precoding matrix composed of non-zero channel vectors under this Rank. Generally, there will be N columns of codewords when the Rank is N. Therefore, we can divide the codebook $\Re$ into multiple sub-codebooks according to the Rank, as shown in the following Table 1.

TABLE 1

Dividing the codebook $\Re$ into multiple sub-codebooks according to the Rank $\Re$ Number of layers v (Rank)

| 1 | 2 | ... | N |
|---|---|---|---|
| $\Re_1$ | $\Re_2$ | ... | $\Re_N$ |
| The codeword vector with the column number of 1 | The codeword matrix with the column number of 2 | | The codeword matrix with the column number of N |

Wherein, when Rank>1, the codewords needing to be stored are all in the form of matrix, for example this feedback method of codebook quantification is used in the LTE protocol, and the corresponding codebook is as shown in Table 2.

TABLE 2

LTE 4Tx codebook

| Codebook index | $u_n$ | Total number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}W_{10}^{\{1324\}}/2$ | |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}W_{11}^{\{1324\}}/2$ | |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}W_{12}^{\{1234\}}/2$ | |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}W_{13}^{\{1324\}}/2$ | |

In the Third party project partner (3GPP), a simple feedback method based on codebook is adopted in the uplink channel information feedback in the LTE Release 8 (R8).

Generally, in the MIMO, the codebook feedback method is:

➢ A UE obtains the channel matrix information, and selects from the codebook a "Rank" value (which can also be interpreted as the number of layers for space multiplexing) mostly suitable to the current channel and a certain corresponding codeword PMI under this Rank. It is assumed that the base station uses MIMO, pre-codes according to the codeword, and calculates the corresponding CQI;
➢ the UE feeds back and recommends the calculated optimal RI/PMI/CQI on the uplink channel.
Wherein:
Rank Information (RI) represents the Rank information of the channel;
precoding Matrix Indicator (PMI) is precoding indicator information based o the codebook;
and Channel Quality Indicator (CQI) is channel quality indicator information after precoding, and can be interpreted as, but not completely equivalent to, the characterizing eigenvalue information to a certain extent. It is associated with the feedback precision of the PMI, and is generally represented quantitatively in the modulation coding mode of transmission blocks.

In the LTE standard 36-213 protocol, the CQI is indicated by integer values of 0-15, which represent different CQI levels respectively. Different CQIs correspond to respective modulation modes and coding code rates (i.e., Modulation Coding Scheme (MCS)), including 16 cases in total, and can be indicated using 4-bit information, as shown in Table 3, but is not limited to this CQI representing method.

TABLE 3

Relationship between CQI index and MCS

| CQI index | Modulation mode | Code rate x 1024 | Efficiency |
|---|---|---|---|
| 0 | | Exceed | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In the MIMO system, the Rank is restraint to be 1 for feedback, and the vectors can only be quantified by selecting codewords from the codebook of Rank 1, the Rank information is defaulted and does not need to be fed back, and the CQI feedback method is similar to the traditional MIMO feedback method.

In the LTE-Advance (LTE-A), the performance of MIMO needs to be enhanced greatly in this version. If the feedback method in the original LTE MIMO mode is used, when it needs to dynamically switch to the Multiple User-MIMO (MU-MIMO) mode in the case of high Rank, since the higher Rank is, the lower the corresponding codebook precision is, the base station cannot obtain accurate channel feedback information to perform Interference suppression/cancellation in the precoding, and the precoding performance of the MU-MIMO will be very bad. However, if the feedback method of the MU-MIMO mode is used, the number of quantified vectors is too small, and cannot support the MIMO of high Rank.

Prior art 1: in the 802.16m standard, the adopted method is as follows: the RI/PMI/CQI is fed back according to the Single User-MIMO (SU-MIMO) mode. If it is high-Rank feedback, the first column is used, and the precoding is calculated using the function F to perform MIMO; or, all the columns are used, information of the user is based, and precoding is calculated using the precoding algorithm to perform MIMO. It is found through simulation that since few bits are used to quantify multiple vectors in the case of high Rank, the accuracy is very poor, and thus the performance is very bad.

Prior art 2: referring to FIG. 1, a terminal feeds back RI/PMI/CQI according to the SU-MIMO mode, and uses the enhanced technique, such as differential codebook and adaptive codebook, to improve the codebook precision. For example, RI/PMI/CQI is fed back according to the SU-MIMO mode, and it is assumed that PMI is W, and a codeword D is selected from the differential codebook $C_{df}$ and its corresponding index is fed back, and a rule $\Omega(W,D)$ is regulated, thus obtaining a more accurate vector feedback information. However, when feedback occurs in high Rank, i.e., there are multiple Ranks, as can be seen from FIG. 1, the $C_{df}$ in this solution needs to design a set of codewords for different Ranks of User Equipments (UEs), and it still need many codewords to adjust the W to be accurate enough.

Prior art 3: referring to FIG. 2, a terminal feeds back RI/PMI/CQI respectively according to different MIMO modes. The performance of this feedback is better than those of the previous two, but its feedback overhead is also the highest. As can be seen, two sets of feedback that are totally independent from each other are needed to feed back different MIMO systems in this solution.

SUMMARY OF THE INVENTION

The technical problem to be solved in the present invention is to provide a method and system for Multiple Input Multiple Output (MIMO) channel information feedback in order to solve the problem that the high precision and low overhead required for high-Rank feedback cannot be met simultaneously in the MIMO channel information feedback, thereby realizing channel information feedback of high precision and low overhead, and well supporting multiple vector feedback needed by high rank (more layer multiplexing) MIMO transmission and high-precision feedback needed by low rank MIMO transmission simultaneously.

In order to solve the above problem, the present invention provides a method for Multiple Input Multiple Output (MIMO) channel information feedback, comprising the following steps of:

a terminal selecting part of column vectors for MIMO system feedback from a codebook matrix W corresponding to a Precoding Matrix Indicator (PMI) and marking the selected part of column vectors as $W_{part}$; and the terminal determining information O which represents high-precision vector quantification information of MIMO along with the part of column vectors $W_{part}$ according to a common representation relationship F, and feeding back the information O to a base station.

The common representation relationship F is a mapping relationship or a function relationship.

When being the function relationship, the common representation relationship F is in a form of left multiplication, right multiplication, or dot multiplication, or different combinations thereof.

The step of the terminal selecting part of column vectors $W_{part}$ for MIMO system feedback comprises:
using a fixed certain column or fixed certain columns in the codebook matrix W to be determined as $W_{part}$.

In the step of the terminal feeding back the information O to a base station, the information O is fed back to the base station in the form of codebook, or in the form of element quantification.

When the common representation relationship F is the mapping relationship, the step of the terminal determining the information O of the high-precision vector quantification information comprises: the terminal defining a codebook C around the part of column vectors $W_{part}$ according to the mapping relationship F and taking an index of the codebook C as the information O.

After the step of the terminal feeding back the information O to a base station, the method further comprises:

the terminal finding out the part of column vectors $W_{part}$ from the codebook matrix W corresponding to the received PMI, and obtaining the high-precision vector quantification information used for MIMO using the $W_{part}$ and the received information O.

The method further comprises:

the terminal further feeding back Rank information (RI) to the base station, and when the Rank information RI≥2, feeding back the PMI to the base station, and also feeding back precoding information corresponding to being less than the RI value.

In order to solve the above problem, the present invention further provides a terminal supporting Multiple Input Multiple Output (MIMO) for feeding back MIMO channel information, comprising:

a feedback module, which is configured to: feed back channel information to a base station in a channel Rank information (RI)/Precoding Matrix Indicator (PMI)/Channel Quality Indicator (CQI) mode, and select one or more columns from a codebook matrix W corresponding to the PMI according to certain rules and mark the one or more columns as a part of column vectors $W_{part}$, obtain the information O for representing the part of column vectors $W_{part}$ with high-precision vector quantification information, and feed back the information O to the base station.

The feedback module is configured to: obtain the information O using the part of column vectors $W_{part}$ according to the common representation relationship F, wherein, the common representation relationship F is a mapping relationship or a function relationship.

The feedback module is further configured to: feed back the Rank information (RI) to the base station, and when RI≥2, feed back the PMI to the base station, and also feed back precoding information corresponding to being less than the RI value.

When being a function relationship, the common representation relationship F is in a form of left multiplication, right multiplication, or dot multiplication, or different combinations thereof.

The feedback module is configured to feed back the information O to the base station in the following way: the information O is fed back to the base station in the form of codebook, or in the form of element quantification.

When the common representation relationship F is a mapping relationship, the feedback module is configured to obtain the information O for representing the part of column vectors $W_{part}$ with the high-precision vector quantification information in the following way: the terminal defining a codebook C around the part of column vectors $W_{part}$ according to the mapping relationship F and taking an index of the codebook C as the information O.

In order to solve the above problem, the present invention provides a base station supporting Multiple Input Multiple Output (MIMO) for feeding back MIMO channel information, comprising:

a receiving module, which is configured to: receive channel information fed back to the base station by a terminal supporting MIMO in a channel Rank information (RI)/Precoding Matrix Indicator (PMI)/Channel Quality Indicator (CQI) mode, and receive information O fed back to the base station by the terminal, wherein, the information O is information for representing part of column vectors $W_{part}$ with the high-precision vector quantification information obtained after the terminal selects one or more columns from the codebook matrix W corresponding to the PMI according to certain rules and marks the one or more columns as the part of column vectors $W_{part}$; and, a quantification information obtaining module, which is configured to find out the part of column vectors $W_{part}$ from the codebook matrix W corresponding to the received PMI, and obtain the high-precision vector quantitative information used for MIMO using the $W_{part}$ and the received information O according to the common representation relationship F.

The MIMO performance in the present invention is greatly enhanced over the prior art 1. Since much overhead and complicated codebooks are required for obtaining accurate feedback of multiple vectors in the prior art 2, less overhead cannot achieve the enhanced effect, and the wireless communication system is usually restricted in terms of feedback. Since MIMO is less sensitive to the number of vectors than the feedback precision, by focusing on the enhancement of the precision of part of the vectors in the present invention, a performance close to that in prior art 2 can be achieved using less feedback. The prior art 3 uses two completely independent sets of feedback, and thus has a high overhead, and the overhead in the present invention can be less than that in the prior art 3.

PREFERRED EMBODIMENTS OF THE INVENTION

In order to make the objects, technical solutions and advantages of the present invention more clear, the present invention will be described in further detail below with reference to the drawings.

The present invention provides a method for channel information feedback that is suitable to MIMO technology, and can well support multiple vector feedback needed by high Rank (more layer multiplexing) MIMO and high-precision feedback, with a small overhead and a good backward compatibility.

Figure 5:
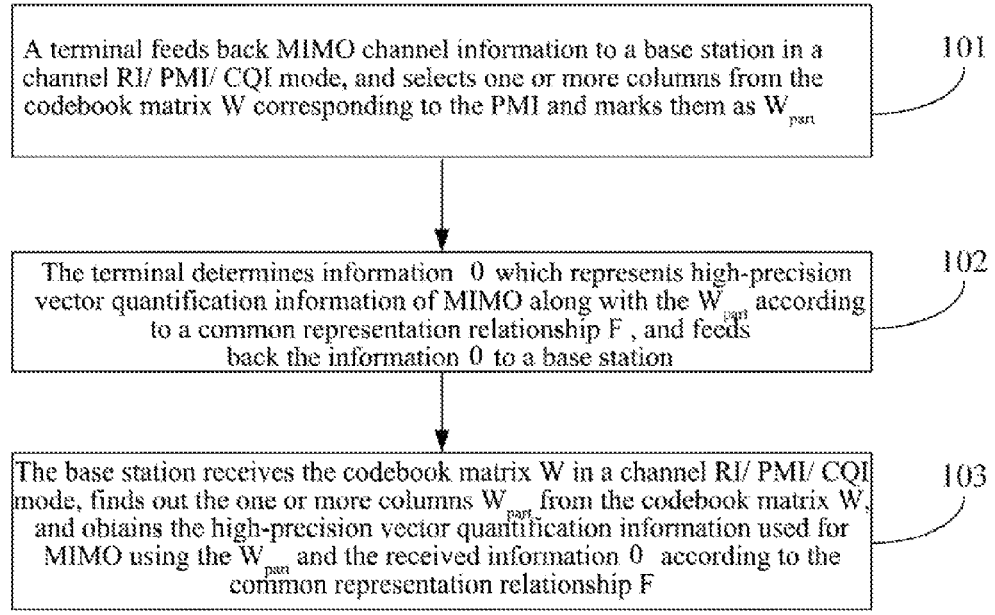
FIG. 5 illustrates the method for MIMO channel information feedback according to an example of the present invention.

The method for MIMO channel information feedback of the present invention is as shown in FIG. 5, comprising the following steps.

In step 101, a terminal feeds back MIMO channel information to a base station in a channel Rank information (RI)/Precoding Matrix Indicator (PMI)/Channel Quality Indicator (CQI) mode, and selects one or more columns from the codebook matrix W corresponding to the PMI and marks the one or more columns as $W_{part}$.

In step 102, the terminal determines information O which represents high-precision vector quantification information of MIMO along with the $W_{part}$ according to a common representation relationship F, and feeds back the information O to a base station.

In step 103, the base station receives the codebook matrix W in a channel Rank information (RI)/Precoding Matrix Indicator (PMI)/Channel Quality Indicator (CQI) mode, finds out the one or more columns $W_{part}$ from the codebook matrix W, and obtains the high-precision vector quantification information used for MIMO using the $W_{part}$ and the received information O according to the common representation relationship F.

Wherein, the common representation relationship F is a mapping relationship F or a function relationship F.

In step 101, the terminal can perform feedback based on the feedback mode of CQI/RI/PMI and a codebook as Table 1. The feedback mode in this step has been introduced in the Background Art, and thus will not be repeated here. Wherein, PMI is fed back in the form of index, the vector or matrix in the represented codebook is denoted by W. The codebook may be the codebook of LTE R8 or any other codebooks.

The specific feedback technologies of CQI comprise various specific technologies such as differential CQI feedback; the specific feedback technologies of CQI also comprise CQI feedback for the whole band or CQI feedback for part of the band.

When the W indicated by feedback have multiple columns, the terminal UE can indicate, through feedback, part of the columns (one or more columns) that may be used for MIMO, and marks them as $W_{part}$. As for the $W_{part}$, the base station and the UE can be required to use fixed certain one or more columns by regulations; or by way of agreement, the base station and the UE use one or more columns determined by the same agreed rule.

In step 102, the terminal UE feeds back the information O to the base station, and the information O and the $W_{part}$ can collectively represent the high-precision vector quantitative information applicable to MIMO according to a common representation relationship F. The information O may be fed back in the form of codebook, or in the form of element quantification.

The common representation relationship may be a mapping relationship or a function relationship F. The common representation relationship F may be in various specific forms such as left multiplication, right multiplication, or dot multiplication, and different combinations thereof, and is not limited thereto.

For example, $F(O, W_{part}) = O \times W_{part}$ or $F(O, W_{part}) = f(W_{part}) \times O$.

The $f(W_{part})$ is a function, for example, a unitary matrix $[W_{part}\ O_{W_{part}}^\perp]$ or a unitary matrix $[conj(W_{part})\ O_{W_{part}}^\perp]$ obtained according to $W_{part}$. $conj(W_{part})$ denotes performing conjugation on $W_{part}$. $O_{W_{part}}^\perp$ denotes multiple column vectors orthogonal to the $W_{part}$. Furthermore, when $W_{part}$ has one column, $f(W_{part})=HH(\eta - W_{part})$. HH denotes Household conversion, and $\eta$ is $[1\ 0\ 0\ 0]^T$.

The common representation relationship may also be a mapping relationship. For example, a codebook corresponding to $W_{part}$ or a codebook composed of some codewords in a certain big codebook is found out through $W_{part}$ according to the mapping relationship F, and information representing a certain codeword therein, i.e., information O, is fed back based on the codebook.

In step 103, the base station receives the channel information fed back by the terminal in the RI/PMI/CQI mode, and after receiving W and finding out $W_{part}$, it also receives the information O, and obtains accurate quantification information of part of the vectors according to the received information O and the $W_{part}$.

Furthermore, the base station can obtain accurate quantification of part of the vectors according to the same function relationship F as adopted by the terminal in step 102, i.e., according to $F(O, W_{part})$.

Furthermore, the base station can obtain the high-precision vector quantification information used for MIMO according to $W_{part}$, the same mapping relationship F as adopted in step 102, and the information O.

Figure 1:
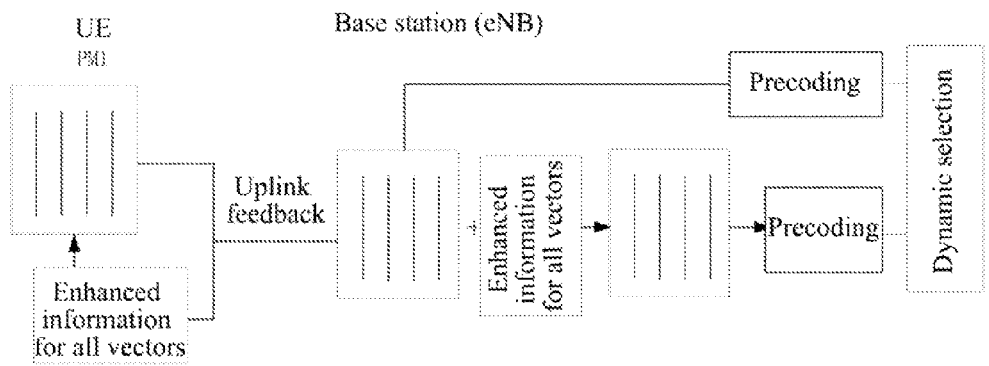
FIG. 1 illustrates the channel feedback method adopted in prior art 2 in the Background Art.
Figure 2:
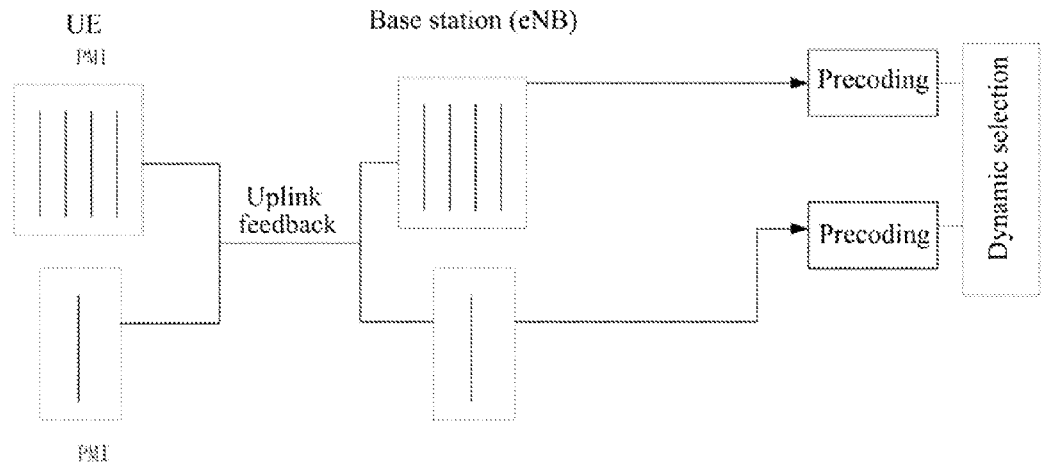
FIG. 2 illustrates the channel feedback method adopted in prior art 3 in the Background Art.
Figure 3:
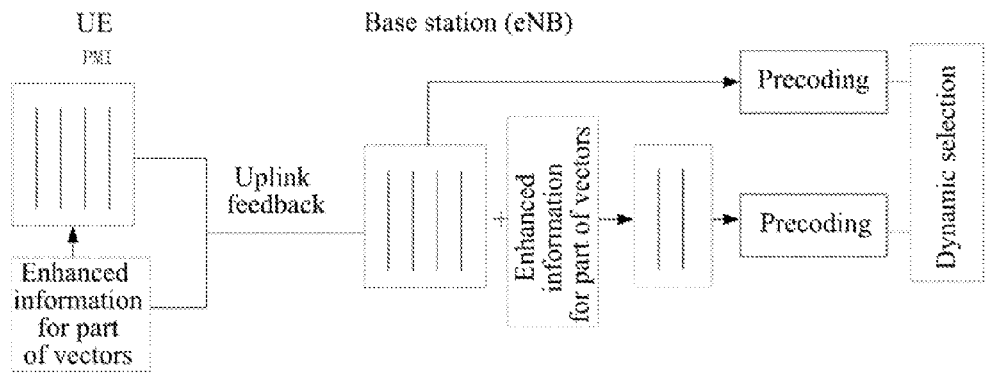
FIG. 3 illustrates the system for MIMO channel information feedback according to the present invention.

FIG. 3 illustrates the system for channel information feedback according to the present invention. The system for MIMO channel information feedback comprises a terminal and a base station supporting Multiple Input Multiple Output (MIMO), wherein, the terminal is configured to: feed back MIMO channel information to the base station in a channel Rank information (RI)/Precoding Matrix Indicator (PMI)/Channel Quality Indicator (CQI) mode, and select one or more columns from the codebook matrix W corresponding to the PMI and mark them as $W_{part}$, obtain the information O for representing the feedback module with the high-precision vector quantification information, and feed back the information O to the base station;

the base station is configured to: receive the codebook matrix W in a channel Rank information (RI)/Precoding Matrix Indicator (PMI)/Channel Quality Indicator (CQI) mode, find out the one or more columns $W_{part}$ from the codebook matrix W, and obtain the high-precision vector quantification information used for MIMO using the $W_{part}$ and the received information O.

The one or more columns $W_{part}$ obtains the high-precision vector quantification information used for MIMO using the $W_{part}$ and the received information O according to the common representation relationship F. The common representation relationship F is a mapping relationship F or a function relationship F.

The present invention further provides a terminal supporting Multiple Input Multiple Output (MIMO) for feeding back MIMO channel information, comprising:

a feedback module, which is configured to: feed back channel information to a base station in a channel Rank information (RI)/Precoding Matrix Indicator (PMI)/Channel Quality Indicator (CQI) mode, and select one or more columns from the codebook matrix W corresponding to the PMI according to certain rules and mark them as the part of column vectors $W_{part}$, obtain the information O for representing the feedback module with the high-precision vector quantification information, and feed back the information O to the base station.

The feedback module is configured to: obtain the information O using the part of column vectors $W_{part}$ according to the common representation relationship F, wherein, the common representation relationship F is a mapping relationship or a function relationship.

The feedback module is further configured to: feed back the Rank information (RI) to the base station, and when RI≥2, feed back the PMI to the base station, and also feed back precoding information corresponding to being less than the RI value.

When being a function relationship, the common representation relationship F is in a form of left multiplication, right multiplication, or dot multiplication, or different combinations thereof.

The feedback module is configured to feed back the information O to the base station in the following way: the information O is fed back to the base station in the form of codebook, or in the form of element quantification.

When the common representation relationship F is a mapping relationship, the feedback module is configured to obtain the information O for representing the feedback module with the high-precision vector quantification information in the following way: the terminal defining a codebook C around the part of column vectors $W_{part}$ according to the mapping relationship F and taking an index of the codebook C as the information O.

The present invention further provides a base station supporting Multiple Input Multiple Output (MIMO), comprising:

a receiving module, which is configured to: receive channel information fed back to the base station by a terminal supporting MIMO in a channel Rank information (RI)/Precoding Matrix Indicator (PMI)/Channel Quality Indicator (CQI) mode, and receive information O fed back to the base station by the terminal, wherein, the information O is information for representing part of column vectors $W_{part}$ with the high-precision vector quantification information obtained after the terminal selects one or more columns from the codebook matrix W corresponding to the PMI according to certain rules and marks the one or more columns as the part of column vectors $W_{part}$; and, a quantification information obtaining module, which is configured to find out the part of column vectors $W_{part}$ from the codebook matrix W corresponding to the received PMI, and obtain the high-precision vector quantitative information used for MIMO using the $W_{part}$ and the received information O according to the common representation relationship F.

EXAMPLE 1

A UE obtains channel matrix information, and selects a codeword suitable for SU-MIMO precoding from the LTE 4Tx codebook shown in Table 2 according to rules such as biggest capacity or smallest chordal distance and marks it as SU_PMI. It is assumed that the Rank is 2, i.e., the codeword is a matrix composed of two columns of vectors.

Figure 4:
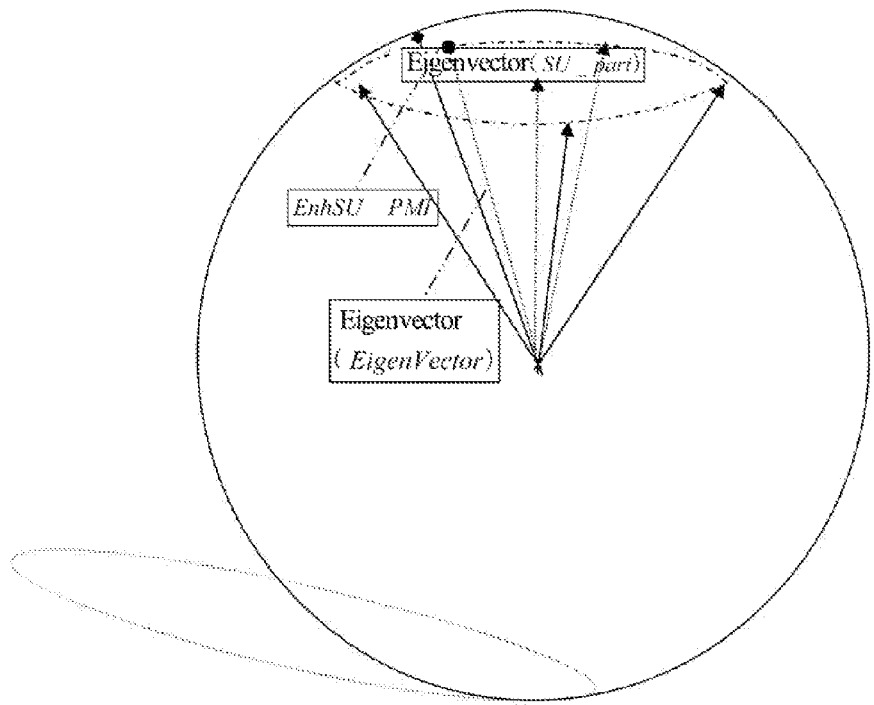
FIG. 4 illustrates determining the codebook C and the closet vector therein using a mapping relationship according to specific example 1 of the present invention.

Based on one column among them, the UE considers the column as rough quantification information of a certain eigenvector. As shown in FIG. 4, the eigenvector corresponding to the column is marked as SU_part. As to which column is taken as the SU_part, the UE and the base station can make an appointment on taking a fixed certain column in the matrix as the SU_part; or, a certain column in the matrix is determined as the SU_part according to a certain appointed rule, for example, the column with the biggest CQI is taken as the SU_part.

Furthermore, by defining a mapping relationship F, a codebook (triangle arrow vector and diamond arrow vector) distributed around the SU_part vector can be found out and defined as C. A codeword vector (diamond arrow vector) closest to the eigenvector (rounded arrow vector) in the codebook C is fed back along with its index, which is marked as O, and the UE feeds back the information of a certain codeword in the C to the base station.

The base station, after receiving SU_PMI, finds out the specific SU_part from the SU_PMI, and then finds out the codebook C, or the definition interpreted as the codebook C, according to the mapping relationship F. The codeword representing the high-precision eigenvector is found out from C according to the index O and is used for precoding.

EXAMPLE 2

Similar to Example 1, a UE obtains channel matrix information, and selects a codeword suitable for SU-MIMO precoding from the codebook shown in Table 2 according to rules such as biggest capacity or smallest chordal distance and marks it as SU_PMI. It is assumed that the Rank is 3, i.e., the codeword is a matrix composed of three columns of vectors.

Based on one column among them, the UE considers the column as rough quantification information of a certain eigenvector, and marks it as SU_part.

Furthermore, a function relationship F is defined, and a codebook indicating rotating the SU_part vector is defined as C. A rotating codebook is generally a unitary matrix and can adjust the SU_part in different directions and at different levels. A codeword is selected from C such that the SU_part is closer to the practical eigenvector after rotation of the codeword. And its index is feedback and is marked as O.

The base station, after receiving SU_PMI, finds out the specific SU_part from the SU_PMI, and then finds out the rotation codeword according to the index O of the rotation codebook C, and according to the function relationship F, the SU_part is adjusted using O to obtain a higher-precision representation of the eigenvector and this higher-precision representation is used for MU precoding.

EXAMPLE 3

In the above examples, the precision enhancement is implemented for one column of eigenvectors, and can also be implemented for two columns of eigenvectors.

Similar to Example 1, a UE obtains channel matrix information, and selects a codeword suitable for SU-MIMO precoding from the codebook shown in Table 2 according to rules such as biggest capacity or smallest chordal distance and marks it as SU_PMI. It is assumed that the Rank is 8, i.e., the codeword is a matrix composed of eight columns of vectors.

Based on two columns among them, the UE considers the column as rough quantification information of certain two eigenvectors, and marks it as SU_part, which is here a matrix indicating information of two vectors, and may also be interpreted as a two-dimensional sub-space.

Furthermore, a function relationship F is defined, and a codebook indicating rotating the SU_part vector is defined. A rotating codebook is generally a unitary matrix and can adjust the SU_part in different directions and at different levels. The codebook is defined as C. A codeword is selected from C such that the SU_part is closer to the practical sub-space represented by certain two eigenvectors after rotation of the codeword, and its index is feedback to the base station and is marked as O.

The base station, after receiving SU_PMI, finds out the specific SU_part from the SU_PMI, and then finds out the rotation codeword according to the index O of the rotation codebook C, and according to the function relationship F, the SU_part is adjusted using O to obtain a higher-precision representation of two eigenvectors of the eigenvectors and this higher-precision representation is used for precoding.

The above examples are only preferred examples of the present invention, and are not used to limit the present invention. For a person having ordinary skill in the art, the present invention can have various modifications and changes. Any modification, equivalent substitution and improvement made within the spirit and principle of the present invention should be within the protection scope of the claims of the present invention.

INDUSTRIAL APPLICABILITY

The MIMO performance in the present invention is greatly enhanced over the prior art 1. Since much overhead and complicated codebooks are required for obtaining accurate feedback of multiple vectors in the prior art 2, less overhead cannot achieve the enhanced effect, and the wireless communication system is usually restricted in terms of feedback. Since MIMO is less sensitive to the number of vectors than the feedback precision, by focusing on the enhancement of the precision of part of the vectors in the present invention, a performance close to that in prior art 2 can be achieved using less feedback. The prior art 3 uses two completely independent sets of feedback, and thus has a high overhead, and the overhead in the present invention can be even more less than that in the prior art 3.

What is claimed is:

1. A method for Multiple Input Multiple Output (MIMO) channel information feedback, comprising the following steps of:
    selecting, by a terminal, part of column vectors for MIMO system feedback from a codebook matrix W corresponding to a Precoding Matrix Indicator (PMI) and marking the selected part of column vectors as $W_{part}$; and
    determining, by the terminal, information O which represents high-precision vector quantification information of MIMO along with the part of column vectors $W_{part}$ according to a common representation relationship F, and feeding back the information O to a base station,
    wherein, the common representation relationship F is a mapping relationship, and
    wherein, the step of the terminal determining the information O comprises: the terminal defining a codebook C around the part of column vectors $W_{part}$ according to the mapping relationship F and taking an index of the codebook C as the information O.

2. The method according to claim 1, wherein, the step of the terminal selecting part of column vectors $W_{part}$ for MIMO system feedback comprises:
    using a fixed certain column or fixed certain columns in the codebook matrix W to be determined as $W_{part}$.

3. The method according to claim 1, wherein,
    in the step of the terminal feeding back the information O to a base station, the information O is fed back to the base station in the form of codebook, or in the form of element quantification.

4. The method according to claim 1, wherein, after the step of the terminal feeding back the information O to a base station, the method further comprises:
    finding out, by the terminal, the part of column vectors $W_{part}$ from the codebook matrix W corresponding to the received PMI, and obtaining the high-precision vector quantification information used for MIMO using the $W_{part}$ and the received information O.

5. The method according to claim 1, further comprising:
    feeding back, by the terminal, Rank information (RI) to the base station, and when the Rank information RI≥2, feeding back the PMI to the base station, and also feeding back precoding information corresponding to being less than the RI.

6. A terminal supporting Multiple Input Multiple Output (MIMO) for feeding back MIMO channel information, comprising:
    a feedback module, which is configured to: feed back channel information to a base station in a channel Rank information (RI)/Precoding Matrix Indicator (PMI)/Channel Quality Indicator (CQI) mode, and select one or more columns from a codebook matrix W corresponding to the PMI according to certain rules and mark the one or more columns as a part of column vectors $W_{part}$, obtain the information O for representing the part of column vectors $W_{part}$ with high-precision vector quantification information, and feed back the information O to the base station,
    wherein, the feedback module is configured to: obtain the information O using the part of column vectors $W_{part}$ according to a common representation relationship F, wherein, the common representation relationship F is a mapping relationship, and
    wherein, the feedback module is configured to obtain the information O for representing the part of column vectors $W_{part}$ with the high-precision vector quantification information in the following way: the terminal defining a codebook C around the part of column vectors $W_{part}$ according to the mapping relationship F and taking an index of the codebook C as the information O.

7. The terminal according to claim 6, wherein,
    the feedback module is further configured to: feed back the Rank information (RI) to the base station, and when the RI≥2, feed back the PMI to the base station, and also feed back precoding information corresponding to being less than the RI.

8. The terminal according to claim 6, wherein,
    the feedback module is further configured to feed back the information O to the base station in the following way: the information O is fed back to the base station in the form of codebook, or in the form of element quantification.

9. A base station supporting Multiple Input Multiple Output (MIMO), comprising:
    a receiving module, which is configured to: receive channel information fed back to the base station by a terminal supporting MIMO in a channel Rank information (RI)/Precoding Matrix Indicator (PMI)/Channel Quality Indicator (CQI) mode, and receive information O fed back to the base station by the terminal, wherein, the information O is information for representing part of column vectors $W_{part}$ with high-precision vector quantification information obtained after the terminal selects one or more columns from a codebook matrix W corresponding to the PMI according to certain rules and marks the one or more columns as the part of column vectors $W_{part}$; and,
    a quantification information obtaining module, which is configured to find out the part of column vectors $W_{part}$ from the codebook matrix W corresponding to the received PMI, and obtain the high-precision vector quantitative information used for MIMO using the $W_{part}$ and the received information O according to a common representation relationship F,
    wherein, the common representation relationship F is a mapping relationship, and wherein, the information O is obtained in the following way: the terminal defining a codebook C around the part of column vectors $W_{part}$ according to the mapping relationship F and taking an index of the codebook C as the information O.

* * * * *